US012033540B2

(12) United States Patent
Krahl et al.

(10) Patent No.: US 12,033,540 B2
(45) Date of Patent: Jul. 9, 2024

(54) MULTI ADHESIVE LINERLESS LABEL MEDIA

(71) Applicant: McAuliffe Paper Inc., Liverpool, NY (US)

(72) Inventors: William R. Krahl, Baldwinsville, NY (US); Charles Thiaville, Manlius, NY (US); Michael Vigunas, Lititz, PA (US)

(73) Assignee: McAuliffe Paper Inc., Liverpool, NY (US)

( * ) Notice: Subject to any disclaimer, the term of this patent is extended or adjusted under 35 U.S.C. 154(b) by 0 days.

(21) Appl. No.: 17/330,927

(22) Filed: May 26, 2021

(65) Prior Publication Data

US 2021/0375160 A1 Dec. 2, 2021

Related U.S. Application Data

(60) Provisional application No. 63/031,978, filed on May 29, 2020.

(51) Int. Cl.
*G09F 3/10* (2006.01)
*G09F 3/02* (2006.01)

(52) U.S. Cl.
CPC .................. *G09F 3/10* (2013.01); *G09F 3/02* (2013.01); *G09F 2003/0201* (2013.01); *G09F 2003/0241* (2013.01); *G09F 2003/0257* (2013.01)

(58) Field of Classification Search
None
See application file for complete search history.

(56) References Cited

U.S. PATENT DOCUMENTS 5,292,713 A * 3/1994 Stenzel ....................... C09J 7/21 428/40.9
5,508,247 A 4/1996 Tran et al.
5,782,496 A * 7/1998 Casper ....................... G09F 3/10 283/79
6,830,795 B1 12/2004 Downs
2005/0081415 A1 4/2005 Mark
2005/0255298 A1 11/2005 Crum
2009/0162595 A1* 6/2009 Ko .......................... B32B 27/32 118/313
2009/0270003 A1* 10/2009 Anderson .................. C09J 4/00 442/151
2019/0010364 A1 1/2019 Hahnel et al.
2020/0005681 A1 1/2020 Jeske

OTHER PUBLICATIONS

ISA/EPO International Search Report and Written Opinion for corresponding International Application No. PCT/US2021/34402 dated Aug. 31, 2021 (16 pages).

* cited by examiner

*Primary Examiner* — Laura C Powers

(57) ABSTRACT

A linerless label media includes a substrate having a first side, a second side and a longitudinal axis. The first side of the substrate has a release coat. The second side of the substrate has at least one area of a first adhesive having a first thickness, and at least one different area of a second adhesive having a greater thickness than the first thickness of the area of the first adhesive. The greater thickness of the second adhesive reduces a contact between the first adhesive and the release coat when the linerless label media includes a linerless label roll configured for use in a printer. A linerless label roll is also described.

16 Claims, 8 Drawing Sheets

MULTI ADHESIVE LINERLESS LABEL MEDIA

CROSS-REFERENCE TO RELATED APPLICATIONS

This application claims priority to and the benefit of U.S. provisional patent application Ser. No. 63/031,978, MULTI ADHESIVE LINERLESS LABEL MEDIA, filed May 29, 2020, which application is incorporated herein by reference in its entirety.

FIELD OF THE APPLICATION

The application relates to linerless label media, particularly to linerless label media used both as removable or repositionable purchase receipts and a tamper evident security seal for closing a bag or package containing, for example, a purchased product.

BACKGROUND

Sales register purchase receipts are handed and/or provided to a customer following a product purchase or provided in or on a bag or package containing the purchase product. Linerless label media is frequently used in certain industries, such as quick service restaurants, to print receipts and work orders that can be adhered to a purchased product, packaging or goods in process. Often, a bag or package in which a purchased product is placed can be further protected by a security label that provides evidence that the bag or package has been reopened or tampered. With the increased usage of third party delivery services for items such as restaurant orders, grocery items, and other packaged items delivered directly to the business and/or consumer, where the receiving parties are more confident that their order is complete, in good condition, and has not shown evidence of tampering with the linerless security label intact.

SUMMARY

A linerless label media includes a substrate having a first side, a second side and a longitudinal axis. The first side of the substrate has a release coat. The second side of the substrate has at least one area of a first adhesive having a first thickness, and at least one different area of a second adhesive having a greater thickness than the first thickness of the area of the first adhesive. The greater thickness of the second adhesive reduces a contact between the first adhesive and the release coat when the linerless label media includes a linerless label roll configured for use in a printer.

The first side of the substrate can further include a layer of thermoreactive or thermosensitive dyes or inks, which when activated form a printed image.

The area of the first adhesive can include a permanent adhesive and the area of the second adhesive can include a removable or repositionable adhesive.

The removable or repositionable adhesive can include a polymeric, microsphere adhesive.

The second side of the substrate can further include a primer between the substrate and the at least one area of the second adhesive.

The greater thickness of a removable or repositionable adhesive can be between about fifty percent (50%) to four times greater in thickness than the first thickness of the first adhesive.

A plurality of areas of first adhesive can be arranged in a pattern of areas of adhesive.

The pattern of areas of adhesive can include spaces between the plurality of areas of first adhesive wherein a lateral cut across the linerless label media would not intersect the plurality of areas of the first adhesive.

The at least one different area of the second adhesive can be arranged in a pattern of areas.

The area of the second adhesive can include a longitudinal strip of microsphere adhesive substantially centered on the second side of the substrate.

The at least one area of the first adhesive can be at least one longitudinal strip adjacent to the longitudinal strip of microsphere adhesive.

The second side can further include at least one peel edge which is substantially free from adhesive.

A linerless label roll includes a substrate having a first side, a second side and a longitudinal axis along which a roll is wound. The first side of the substrate includes a layer of thermosensitive inks and a release coating over the layer of thermosensitive inks. The second side of the substrate includes at least one area of a first adhesive the first adhesive having a thickness, and at least one different area of a second adhesive the area of the second adhesive having a thickness greater than the thickness of the area of the first adhesive. The greater thickness of the second adhesive reduces contact between the at least one area of the first adhesive and the first side of the substrate to prevent an inadvertent removal or damage to the layer of thermosensitive inks during an unwinding of the linerless label roll.

A multi adhesive linerless label media includes a substrate. A release coat is disposed on an outer surface of a first side of the substrate. A first adhesive of a first thickness is disposed on a second side of the substrate in one or more first adhesive areas. A second adhesive of a second thickness is disposed on the second side of the substrate in one or more second adhesive areas, the second adhesive areas different from the first adhesive areas.

The second adhesive can include a removable or repositionable pressure adhesive and the first adhesive includes a permanent adhesive.

The second thickness of the removable or repositionable pressure adhesive can be greater than the first thickness of the permanent adhesive.

A second release coat can be applied to portions of the first surface of the substrate over areas that, when the media is in roll form, are in contact with the areas of first adhesive on the second side of the substrate.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Table of Reference Designators

| | |
|---|---|
| 100 | linerless label media |
| 101 | substrate |
| 103 | first side |
| 105 | second side |
| 110 | second release coat |
| 112 | first release coat |
| 117 | ink |
| 120 | first adhesive |
| 130 | second adhesive |
| 200 | linerless label |
| 210 | primer |
| 300 | exemplary linerless label |
| 400 | exemplary linerless label |
| 401 | spaces |
| 419 | line marks |
| 421 | optical sensing marks |
| 500 | linerless label |
| 600 | linerless label |
| 700 | linerless label |
| 701 | edge |

Figure 1A:
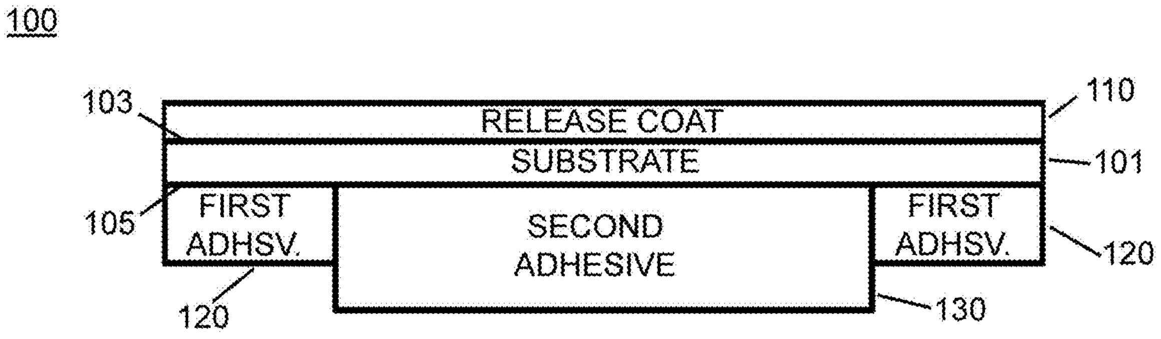
FIG. 1A is a drawing showing an exemplary linerless label according to the Application.

FIG. 1A is a drawing showing an exemplary linerless label 100 according to the Application. A linerless label media 100 includes a substrate 101 having a first side 103, a second side 105 and a longitudinal axis. The first side of the substrate 103 has a release coat 110. The second side 105 of the substrate has at least one area of a first adhesive 120 having a first thickness, and at least one different area of a second adhesive 130 having a greater thickness than the first thickness of the area of the first adhesive 120. The greater thickness of the second adhesive reduces a contact between the first adhesive and the release coat when the linerless label media is converted to a linerless label roll configured for use in a printer.

Figure 1B:
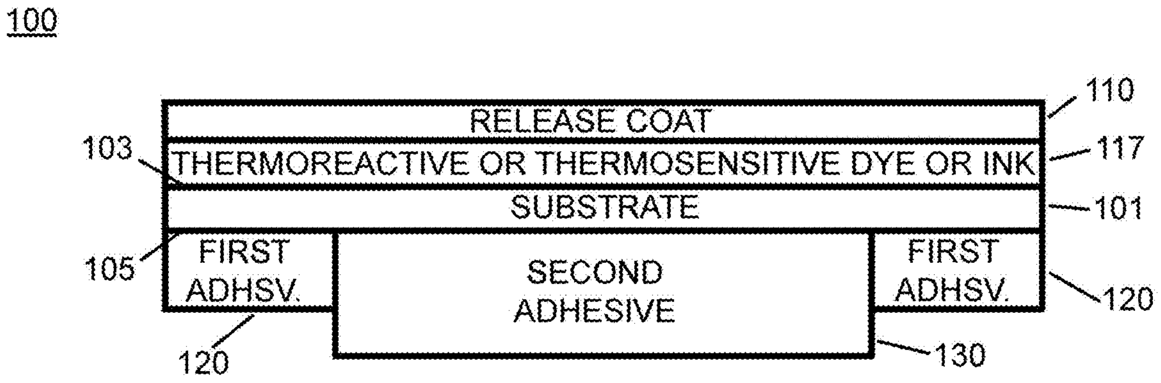
FIG. 1B is a drawing showing an exemplary linerless label with a thermoreactive or thermosensitive dye or ink.

FIG. 1B is a drawing showing an exemplary linerless label 100 with a thermoreactive or thermosensitive dye or ink 117. The first side of the substrate can further include a layer of thermoreactive or thermosensitive dyes or inks, and which when activated form a printed image. Representative substrates pre-coated with thermoreactive dyes include Appvion Résiste® Series thermal coated papers, from Appvion Operations, Inc., of Appleton, WI, including, for example, Résiste® 900. Higher quality thermal papers typically include a binder coat interspersed with and covering the thermoreactive dyes to prevent damage to or removal of the dyes during subsequent processes, such as coating the second side of the substrate with primers and adhesives, or converting larger rolls of media into narrow rolls that are configured and adapted to fit into a printer, including, for example, a point of sale printer. Alternatively, uncoated thermal paper can used where a release coat can cover and bind the thermoreactive dyes to the first side of the substrate.

Release coat is applied to the first side of the substrate to prevent the adhesive of the second side from strongly adhering when the media is rolled upon itself to form a linerless label roll. Where stronger, high adhesion adhesives are used on the second side of the substrate, there is a substantial risk that the more aggressive adhesive will detach areas of the release and the thermoreactive dyes during both processing steps in the manufacture of linerless label media and during the unwinding of the roll of linerless label media during the use of the roll in a printer. The undesired removal of dyes is often referred to as picking and typically results in reduced image quality and satisfaction by end users. An exemplary release material is a non-silicone based release composition available from Omnova. Any suitable silicone based releases can also be used.

Pressure sensitive adhesives are well known in the art and can be based on acrylics, hot-melt, silicone rubbers and other base materials, and are described at length in treatises such as the Handbook of Pressure Sensitive Adhesive Technology by Donatas Satas (2d ed.). Types of commonly used pressure sensitive adhesives may be categorized in different ways, with some categories overlapping, and those types of adhesives include repositionable pressure sensitive adhesives, removable pressure sensitive adhesives, permanent pressure sensitive adhesives, heat-activated adhesives, UV curable adhesives, hot-melt adhesives, water-based adhesives, solvent based adhesives, rubber-based adhesives. While some pressure sensitive adhesives may be solvent based, or rubber based hot-melt materials, water based or waterborne pressure sensitive adhesives are frequently chosen for environmental and food contact applications.

The area of the first adhesive can include a permanent adhesive and the area of the second adhesive can include a removable or repositionable adhesive.

Any suitable permanent adhesive can be used for the first adhesive. A permanent pressure sensitive adhesive is generally not removable without destruction of the tape or label, or substrate to which it is applied. Additionally, many applications for use as a security tape or label may use permanent adhesives with resistance to environmental exposures such as heat, cold, moisture, chemicals and solvents. Other applications may require permanent adhesives to be adhered to paper, plastic, metallic or filmic substrates. Exemplary suitable permanent adhesives include, for example, Engineered Polymer Solutions Acrylic Emulsion 2127 Engineered Polymer Solutions of Marengo, Illinois.

Any suitable removable or repositionable adhesive can be used for the second adhesive. The repositionable adhesive is typically a repositionable pressure adhesive (RPA). A representative method of making a water-based, acrylic polymer repositionable microsphere adhesive can be found in U.S. Pat. Nos. 8,445,104; 9,208,699, and 9,646,517, all issued to MAXStick Products Ltd., of Lancaster, PA, are incorporated herein in their entirety for all purposes. While an RPA is frequently based on polymeric microspheres, other pressure sensitive adhesives formed of acrylic polymer emulsions are removable for short periods, for example, between about 30 seconds and two hours and may also be substituted for repositionable microsphere based adhesives. Additionally, patterns of small amounts of traditional pressure sensitive adhesives can be distributed across a relatively larger area to render an adhesive repositionable. Furthermore, deadening agents may be applied over an area of pressure sensitive adhesive to modify a traditional hot melt, acrylic or silicone based adhesive to achieve the desired effect and performance. The removable or repositionable adhesive can include a polymeric, microsphere adhesive. A representative microsphere adhesive is a GelTac 100 series adhesive, such as, for example, is available from HB Fuller, Royal Adhesives of Syracuse, New York.

Figure 2:
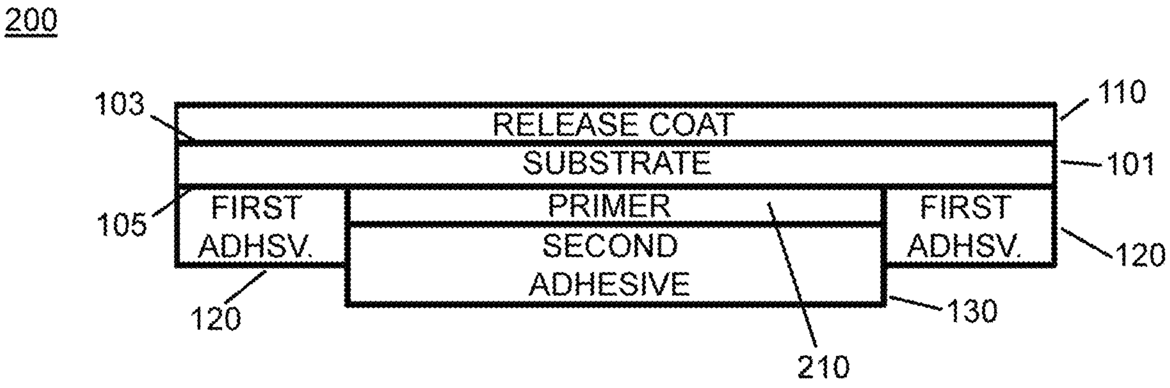
FIG. 2 is a drawing showing an exemplary linerless label where the second side of the substrate includes a primer.

FIG. 2 is a drawing showing an exemplary linerless label 200 where the second side of the substrate includes a primer 210 between the substrate and the at least one area of the second adhesive. Any suitable primer can be used, such as, for example GelTac primer coating available from HB Fuller.

The greater thickness of a repositionable adhesive can be between about fifty percent (50%) to four times greater in thickness than the first thickness of the first adhesive. Due to the lower adhesion and lower initial tack of repositionable adhesives as compared to permanent adhesives, there is a lower risk of damaging the thermal paper by the inadvertent removal of thermoreactive dyes or picking. Additionally, the greater thickness of the area of second adhesive reduces the force or tightness of the roll between the areas of first adhesive and the first side of the substrate and also limits picking or the inadvertent removal of the thermoreactive dyes from the first side of the substrate. Further, picking may also be reduced by utilizing narrow bands or patterns of the first adhesive at or near the lateral edges of the substrate while still providing the function of acting as a tamper evident security seal when the printed label is created and applied over the opening of a bag and/or package and firmly pressing the areas of first adhesive to the bag or package. Narrow bands or patterns of permanent adhesive at or near the edges of the linerless label roll would also provide for broad areas across the center of the first side of the substrate having reduced picking or damage and result in higher image quality printing and end user satisfaction with the linerless label media.

Figure 1C:
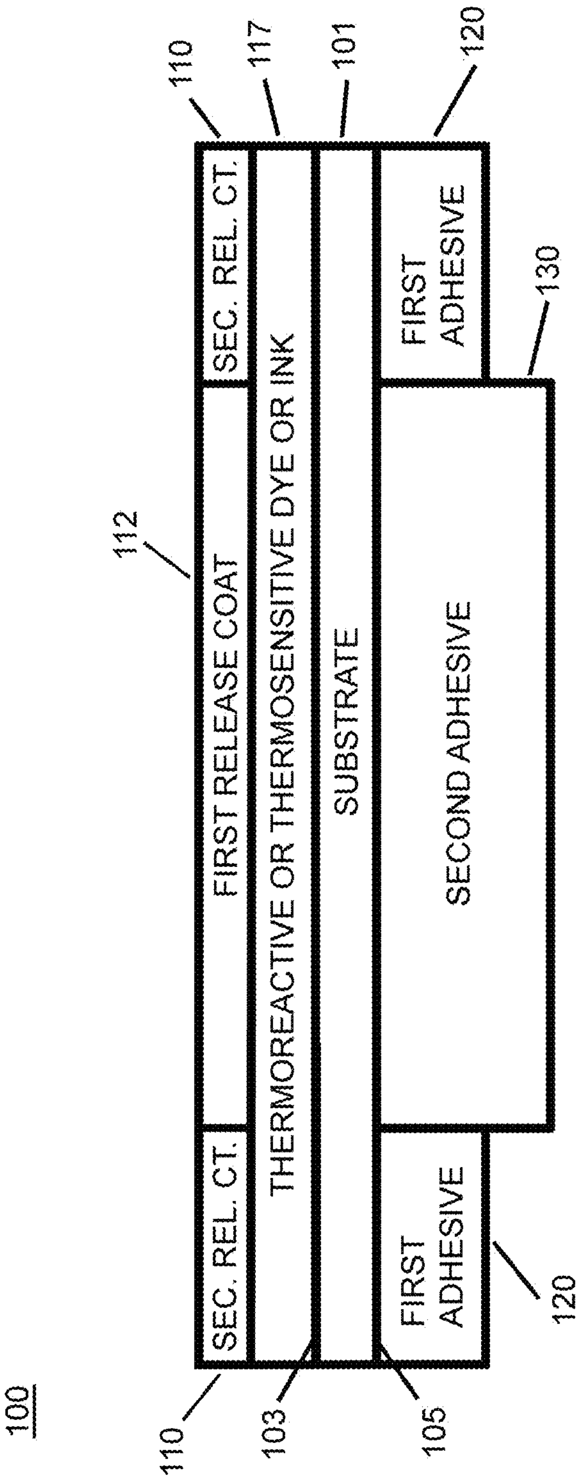
FIG. 1C is a drawing showing a linerless label media having a first release coat and a different second release coat.

FIG. 1C is a drawing showing a linerless label media 100 having a first release coat and a different second release coat. The first release coat 112 can be a non-silicone less binding release coat, that in rolled or folded form is in contact with the second adhesive, such as, for example, a microsphere adhesive in the center. The second release coat 110 can be a silicone, more binding, easier to peel release coat on the edges. The second release coat 110 in a rolled or folded form is disposed across from and near or in contact with the first adhesive, for example, a first adhesive permanent adhesive. The first release coat and the second release coat can have different, or more typically, about the same thickness.

Further, a second release coat may be lane coated on the portions of the first surface that contact the areas of first adhesive. The second release coat would have properties to better seal or bind the thermoreactive dyes to the first surface of the substrate. For example, while silicone-based release coats provide additional protection of the thermoreactive dyes, silicone release coats may cause excess wear on print heads of thermal printers, resulting in decreased image quality and reduce the life cycle of the printers. Where relatively narrow bands of areas of first adhesive are applied at or near the edges of the second side of the substrate, narrow bands of a second, silicone based release coat can be used, which will reduce the wear on the print heads.

In embodiments utilizing a second release coat, the first release coat can be a non-silicone based release coat applied to portions of the first surface of the substrate that are in contact with areas of second adhesive, and a second release coat can be a silicone-based release coat applied to the areas on the first surface of the substrate that are in contact with areas of the first adhesive.

Figure 3:
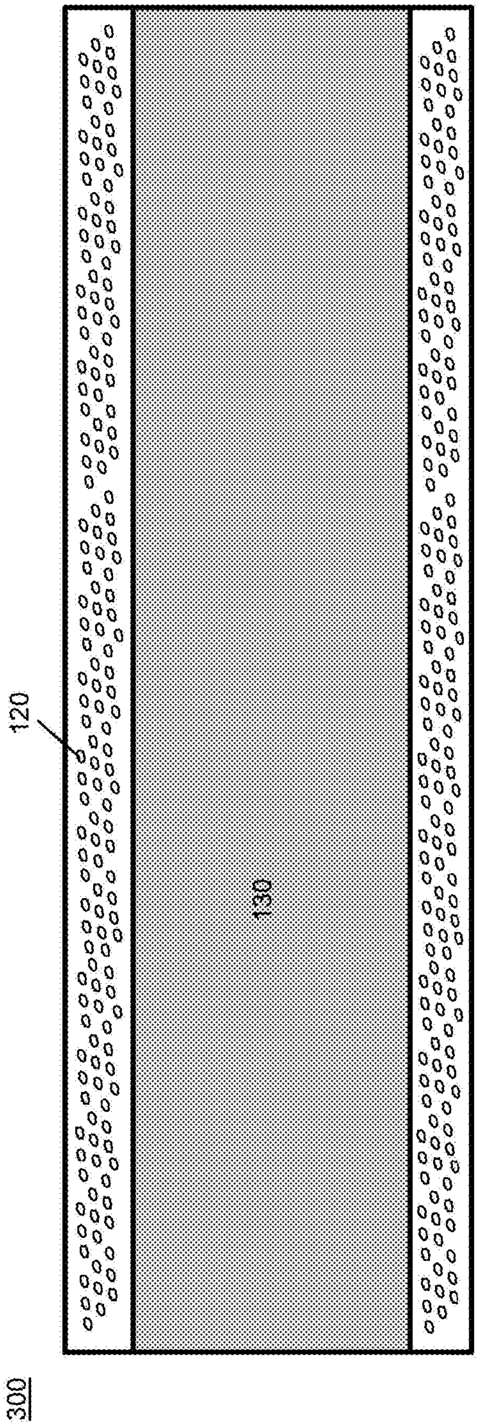
FIG. 3 is a drawing showing an exemplary linerless label where the plurality of areas of first adhesive is arranged in a pattern of areas of adhesive.
Figure 4A:
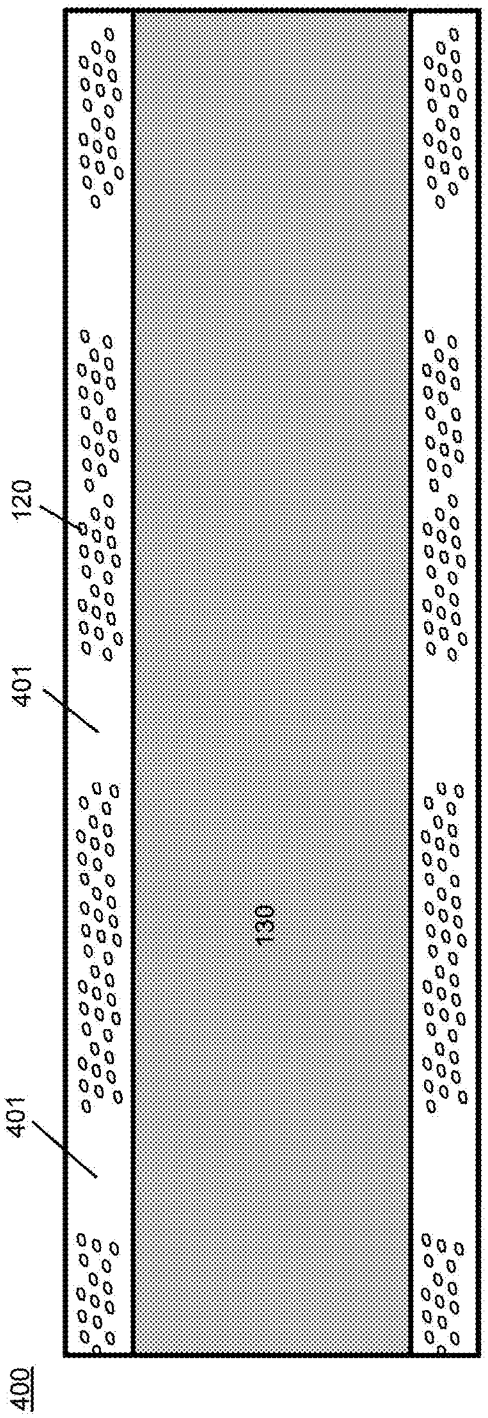
FIG. 4A is a drawing showing an exemplary linerless label where the pattern of areas of adhesive includes spaces between the plurality of areas of first adhesive.

FIG. 3 is a drawing showing an exemplary linerless label 300 where the plurality of areas of first adhesive 120 is arranged in a pattern of areas of adhesive;

FIG. 4A is a drawing showing an exemplary linerless label 400 where the pattern of areas of adhesive includes spaces 401 between the plurality of areas of first adhesive which are substantially free of adhesive where a lateral cut across the linerless label media would not intersect the plurality of areas of the first adhesive.

Adhesive patterns: Any suitable pattern of adhesive can be used for either or both of the first adhesive and/or the second adhesive. Patterns can range from a continuous coverage of the surface, a partial coverage of the surface, to deposits or patterns of adhesive on the surface surrounded and/or separated by adhesive free areas. Suitable patterns of adhesive include continuous longitudinal strips lanes and discontinuous strips or lanes. Discontinuous strips or lanes can include any suitable patterns. Suitable patterns include, for example, diagonal lines, chevrons, stars, diamonds, squares, triangles, rectangles, polygons, etc. and combinations thereof. If it is preferred to not cut through any areas of permanent adhesive in making individual labels or receipts, the areas of first adhesive may be applied in at least one column of rectangular areas of between one quarter inch to one inch in length, interspersed with areas free of first adhesive of between one-eighth inch to one quarter inch in length. Printers, including, for example, Point of Sale (POS) printers can be programmed to detect the areas of first adhesive and cut on the gaps between rectangular areas of first adhesive.

Figure 4B:
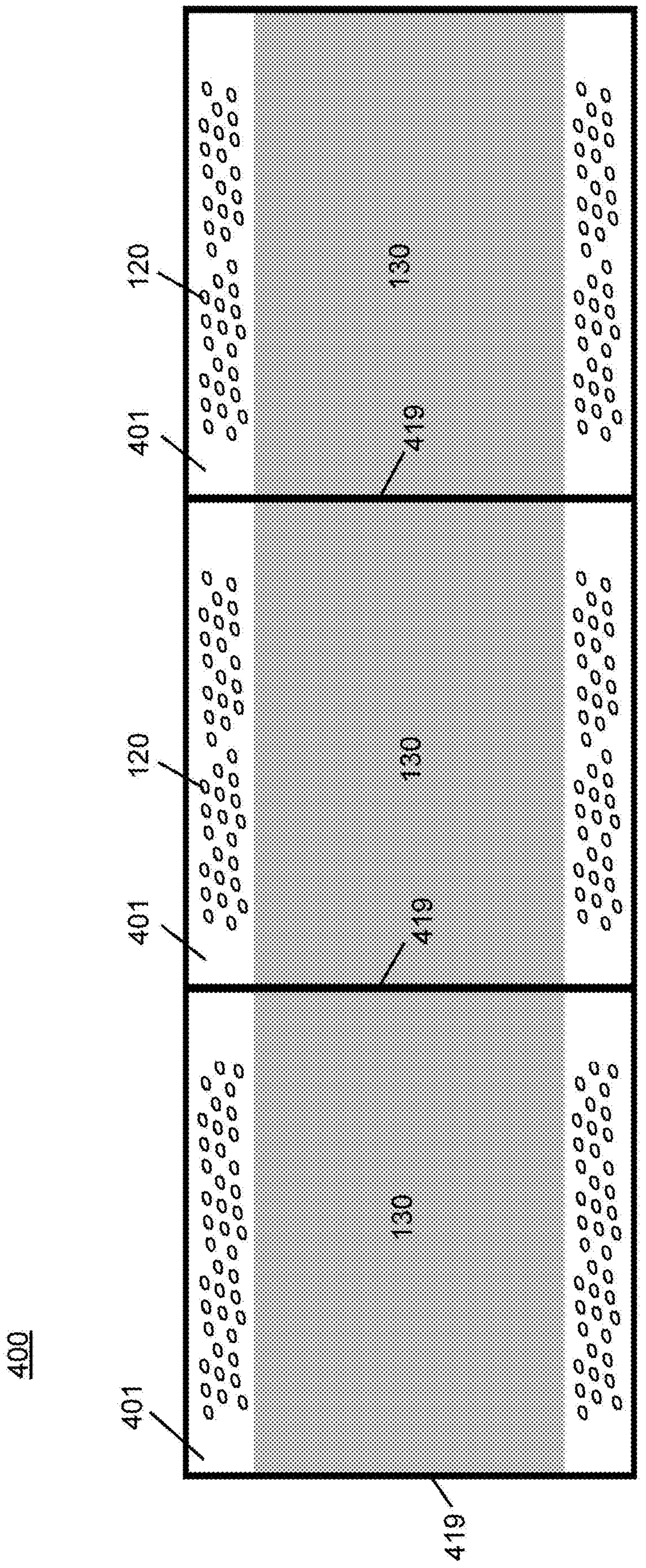
FIG. 4B is a drawing showing an exemplary linerless label with optical cut line marks.
Figure 4C:
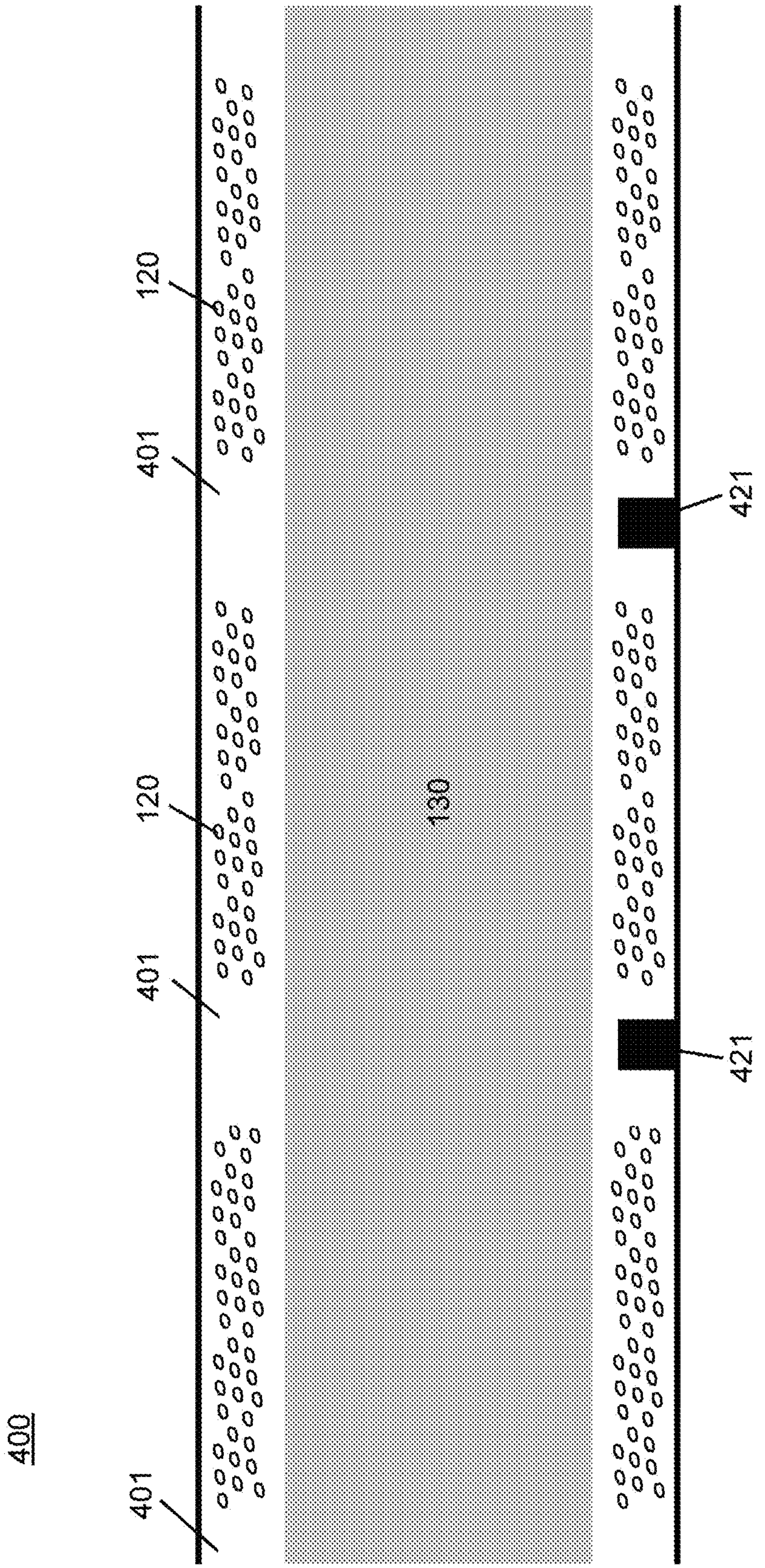
FIG. 4C is a drawing showing an exemplary linerless label with optical sensing marks.

Alternatively, optically scanned timing marks can be printed on the substrate to assist in cutting between the discrete patches of first or permanent adhesive. See, for example, U.S. Pat. No. 7,588,811 to Blank. FIG. 4B is a drawing showing an exemplary linerless label 400 with optical cut line marks 419. Note that optical cut line marks 419 can be printed on the first or second side of the substrate under the second adhesive 130 or in gaps between discrete areas of adhesive, or printed only on the outer edges. FIG. 4C is a drawing showing an exemplary linerless label 400 with optical sensing marks 421.

Similarly, areas of the second adhesive can be applied in discrete patches leaving lateral gaps between longitudinally adjacent areas to permit the cutting mechanism of a point of sale printer to cut where the cutting knife did not intersect with areas of second adhesive. However, where a primer is used between the substrate and the areas of second adhesive that functions as a tie coat to form a better bond between the substrate and the second adhesive, there is substantially less likelihood that cutting through the repositionable adhesive will result in accumulation of adhesive on the cutting mechanism. See, for example, U.S. Pat. No. 8,445,104.

Figure 5:
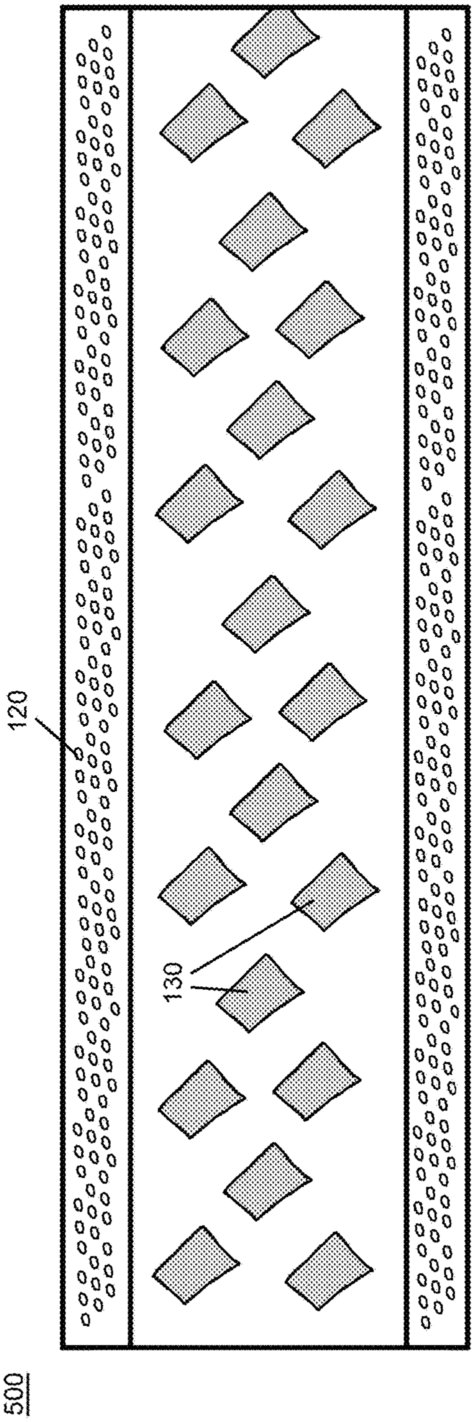
FIG. 5 is a drawing showing an exemplary linerless label where a second adhesive is arranged in a pattern of areas.

The at least one different area of the second adhesive can also be arranged in a pattern of areas. FIG. 5 is a drawing showing an exemplary linerless label 500 where a second adhesive 130 is arranged in a pattern of areas.

Figure 6:
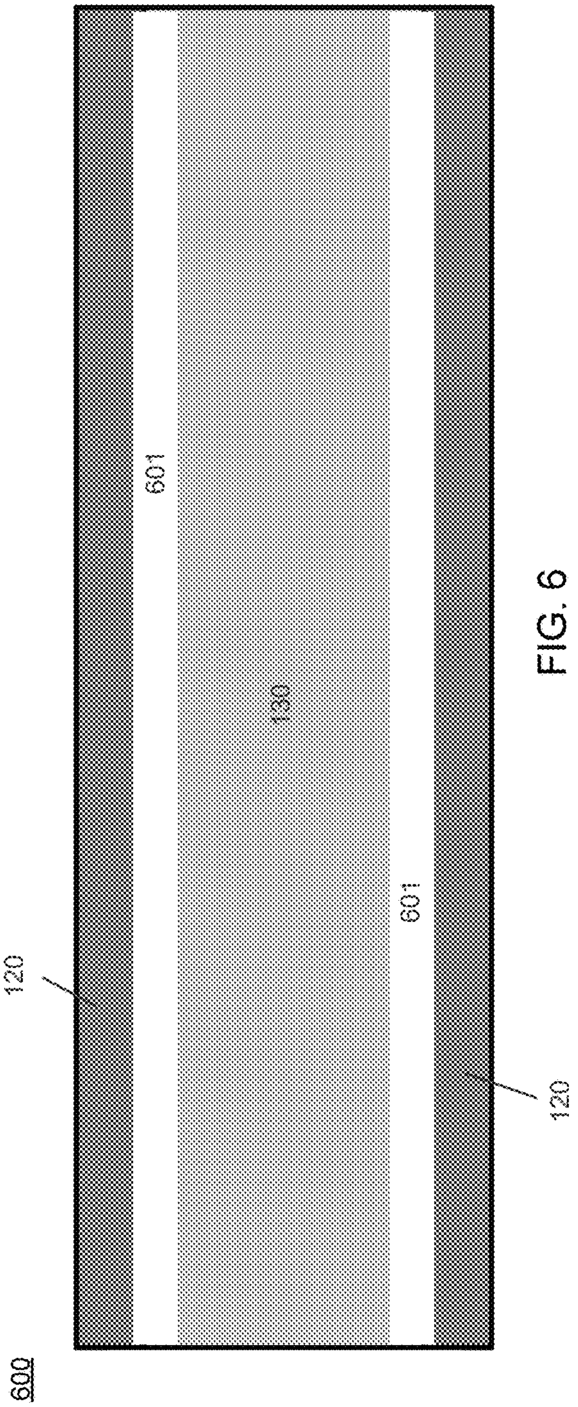
FIG. 6 is a drawing showing an exemplary linerless label where the area of the second adhesive includes a longitudinal strip.

FIG. 6 is a drawing showing an exemplary linerless label 600 where the area of the second adhesive includes a longitudinal strip of microsphere adhesive substantially centered on the second side of the substrate. The at least one area of the first adhesive can be at least one longitudinal strip adjacent to the longitudinal strip of microsphere adhesive (e.g., FIG. 1, FIG. 2). In the exemplary linerless label 600, there are also strips 601 which are substantially free of adhesive.

Figure 7:
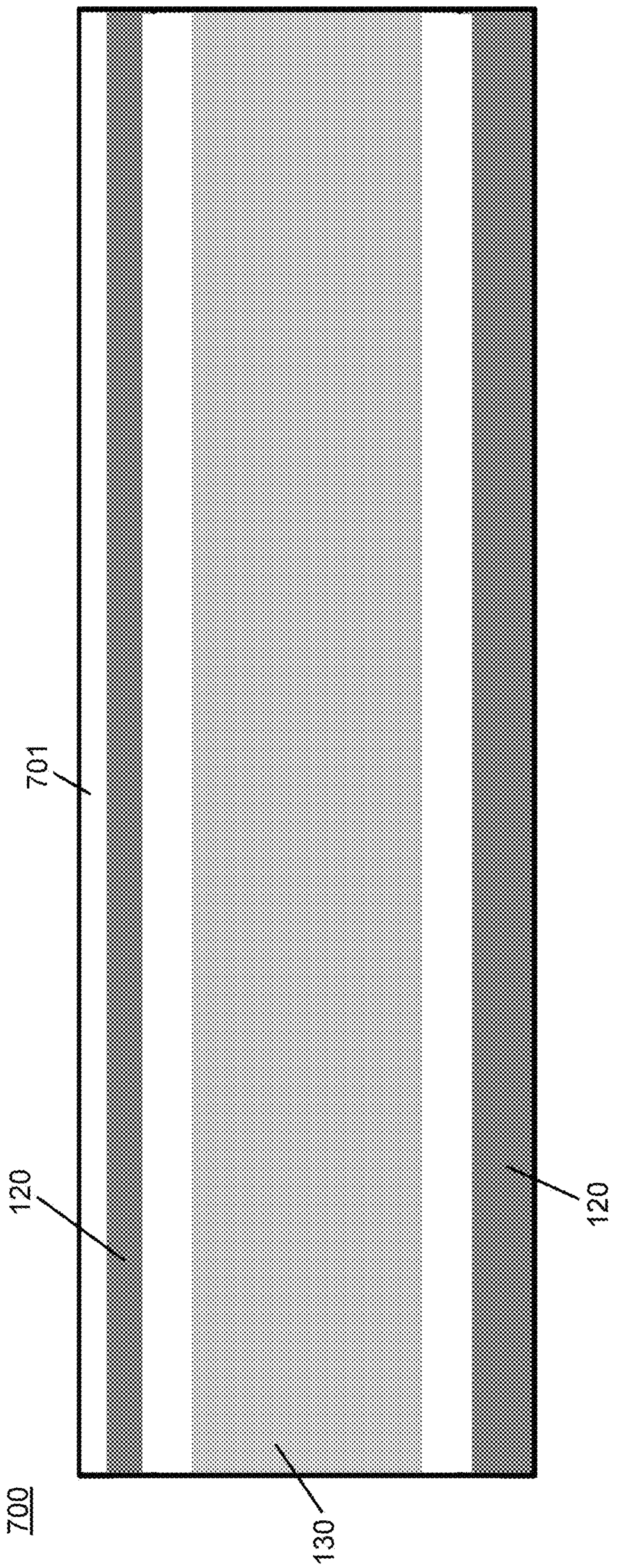
FIG. 7 is a drawing showing an exemplary linerless label where the second side includes at least one peel edge.

FIG. 7 is a drawing showing an exemplary linerless label 700 where the second side includes at least one peel edge 701 which is substantially free of the first adhesive 120. There can also be linerless labels according to the Application, for example, with a peel edge on either side.

Areas free of adhesive—in addition to, or instead of peel areas free of adhesive, there can be areas free of adhesive to improve label handling. A handling edge is one such example, however at least one area free of adhesive can be of any suitable size and shape. For example, there can be at least one area free of adhesive for handling the label prior to placing it on a bag or package. One example of the usefulness of at least one area free of adhesive for handling the label prior to placing the label, is where a worker wears thin latex gloves which might otherwise adhere to an adhesive on the label, tearing the glove, or otherwise damaging the newly printed label.

An exemplary linerless label roll according to the Application includes a substrate having a first side, a second side and a longitudinal axis along which a roll can be wound. The first side of the substrate can include a layer of thermosensitive inks and a release coating over the layer of thermosensitive inks. The second side of the substrate can include at least one area of a first adhesive the first adhesive having a thickness, and at least one different area of a second adhesive the area of the second adhesive having a thickness greater than the thickness of the area of the first adhesive. The greater thickness of the second adhesive reduces contact between the at least one area of the first adhesive and the first side of the substrate to prevent an inadvertent removal or damage to the layer of thermosensitive inks during an unwinding of the linerless label roll.

A multi adhesive linerless label media according to the Application can be provided in any suitable form, such as, for example, as a roll or folded stock. Where a folded stock is used, patterns of the areas of first adhesive and the second adhesive are staggered on alternate folds so that the adhesives do not directly contact other areas of adhesive. U.S. Pat. Nos. 8,45,104; 9,208,699, and 9,646,517, all issued to MAXStick Products Ltd. are incorporated herein in their entirety for all purposes.

Applications

Multi adhesive linerless label media according to the Application can be used in any suitable printer, including for example, label printers, POS printers, etc.

Multi adhesive linerless label media according to the Application can be used in print on demand applications, such as where one or more labels are printed as needed and used for a particular bag or package. Examples of print on demand include logistics uses where packages are labeled and/or security taped at various times and points of shipping from origin to destination. Multi adhesive linerless label media according to the Application are particularly suitable for use in a “last-mile” delivery process.

Print on demand includes many “print and apply” applications where the labels and/or security tape are used shortly after printing. Linerless multi adhesive linerless label media according to the Application can be far more efficient and environmentally friendly where linered labels have previously been used in large quantity label printing applications. The new structures of multi adhesive linerless label media according to the Application also reduce or substantially eliminate printer fouling by adhesive, making the new multi adhesive linerless label media particularly well suited to replace many traditional linered labels which generated significant waste as discarded liner material. Printer fouling (e.g. cutting blade gumming) is reduced in part by minimal (relatively small areas) or no (areas without adhesive) of permanent adhesive.

In summary, a multi adhesive linerless label media includes a substrate. A release coat is disposed on an outer surface of a first side of the substrate. A first adhesive of a first thickness is disposed on a second side of the substrate in one or more first adhesive areas. A second adhesive of a second thickness is disposed on the second side of the substrate in one or more second adhesive areas, the second adhesive areas different from the first adhesive areas. The second adhesive can include a repositionable pressure adhesive and the first adhesive includes a permanent adhesive. The second thickness of the repositionable pressure adhesive can be greater than the first thickness of the permanent adhesive.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A linerless label media comprising:

a linerless label roll comprising:

a substrate including a first side having a printable surface with a layer of thermosensitive dyes or inks, a second side and a longitudinal axis;

the first side of the substrate having a release coat disposed over the layer of thermosensitive dyes or inks;

the second side of the substrate having at least one area of a first non-moisture activated permanent adhesive distributed along a substantial portion of the longitudinal axis, the first permanent adhesive having a first thickness, and at least one different area of a second repositionable microsphere adhesive distributed along a substantial portion of the longitudinal axis, the second repositionable adhesive having a second thickness greater than the first thickness of the area of the first adhesive;

wherein the second thickness of the second repositionable adhesive is between about fifty percent (50%) to about four hundred percent (400%) greater in thickness than the first thickness of the first permanent adhesive;

wherein the second thickness of the second adhesive is configured to reduce surface contact between the first adhesive and the first side of the substrate when in a rolled condition of the substrate to minimize removal or damage to the layer of thermosensitive dyes or inks;

wherein after a section of the linerless label roll is removed the at least one area of the first permanent adhesive provides a tamper evident security seal when the section is applied to a package.

2. The linerless label media of claim 1, wherein the second repositionable adhesive comprises a polymeric, microsphere adhesive.

3. The linerless label media of claim 2, wherein the second side of the substrate further comprises a primer between the substrate and the at least one area of the second repositionable adhesive.

4. The linerless label media of claim 1, wherein a plurality of areas of the first permanent adhesive are arranged in a pattern of areas of adhesive.

5. The linerless label media of claim 4, wherein the pattern of areas of adhesive includes spaces between the plurality of areas of first permanent adhesive wherein a lateral cut across the linerless label media would not intersect the plurality of areas of the first permanent adhesive.

6. The linerless label media of claim 1, wherein the at least one different area of the second repositionable adhesive is arranged in a pattern of areas.

7. The linerless label media of claim 1, wherein the at least one different area of the second repositionable adhesive comprises a longitudinal strip of microsphere adhesive substantially centered on the second side of the substrate.

8. The linerless label media of claim 7, wherein the at least one area of the first permanent adhesive is at least one longitudinal strip adjacent to the longitudinal strip of microsphere adhesive.

9. The linerless label media of claim 1, wherein the second side further comprises at least one peel edge substantially free from adhesive.

10. The linerless label media of claim 1, further comprising a second release coat which is applied to areas of the first surface of the substrate that, when the media is in roll form, are in contact with areas of first permanent adhesive on the second side of the substrate.

11. A linerless label roll comprising:

a substrate having a first side, a second side and defining a longitudinal axis along which the substrate is wound, the substrate defining outer peripheral edges extending along the longitudinal axis;

the first side of the substrate comprising a layer of thermosensitive inks and a release coating over the layer of thermosensitive inks;

the second side of the substrate comprising;

a pair of first outer longitudinal sections of a first adhesive extending along the longitudinal axis disposed adjacent the outer peripheral edges of the substrate, the first adhesive having a first thickness; and a second inner longitudinal section of a second adhesive extending along the longitudinal axis and disposed between individual first longitudinal sections of the pair of first outer longitudinal sections, the second adhesive having a second thickness greater than the first thickness of the first adhesive;

wherein the second thickness of the second adhesive is between about fifty percent (50%) to about four hundred percent (400%) greater in thickness than the first thickness of the first adhesive;

wherein the second longitudinal section extends across a major portion of a lateral width of the substrate determined orthogonal to the longitudinal axis.

12. A multi adhesive linerless label media comprising:

a substrate defining a longitudinal axis and having first and second sides;

one or more-release coats disposed on the first side of the substrate;

a first adhesive of a first thickness disposed on the second side of the substrate in one or more first adhesive areas; and a second adhesive of a second thickness disposed on the second side of the substrate in one or more second adhesive areas, the second adhesive areas different from the first adhesive areas;

wherein the first thickness of the first adhesive is different from the second thickness of the second adhesive;

wherein the second thickness of the second adhesive is between about fifty percent (50%) to about four hundred percent (400%) greater in thickness than the first thickness of the first adhesive;

wherein the first adhesive comprises a permanent adhesive such that the one or more first areas and corresponding one or more portions of the substrate form one or more security seals when applied to a package; and wherein the second adhesive comprises a removable or repositionable adhesive;

wherein the one or more release coats comprise at least one first release coat and at least one second release coat; and wherein when in a rolled condition the at least one first release coat is in contact with the areas of the second adhesive of the substrate and the at least one second release coat is in contact with the areas of the first adhesive of the substrate.

13. The linerless label media of claim 11, wherein the pair of first outer longitudinal sections includes spaces free of the first adhesive material to enable lateral cuts of the substrate without intersecting the first adhesive material.

14. The linerless label media of claim 13, including one or more optical cut lines extending across the substrate and intersecting the spaces free of the first adhesive material of the pair of first outer longitudinal sections.

15. The linerless label media of claim 12, wherein the at least one first release coat and the second release coat comprise different materials.

16. The linerless label media of claim 15, wherein the at least one first release coat is non-silicon based and wherein the at least one second release coat is silicon-based.

* * * * *